(12) United States Patent
Weldy et al.

(10) Patent No.: US 6,181,826 B1
(45) Date of Patent: Jan. 30, 2001

(54) METHOD AND ASSOCIATED APPARATUS FOR ACHIEVING ADDITIONAL SIGNAL LEVEL RESOLUTION FROM A QUANTIZED DIGITAL REPRESENTATION OF AN IMAGE

(75) Inventors: John A. Weldy; James Lawton, both of Rochester, NY (US)

(73) Assignee: Eastman Kodak Company, Rochester, NY (US)

( * ) Notice: Under 35 U.S.C. 154(b), the term of this patent shall be extended for 0 days.

(21) Appl. No.: 07/918,517

(22) Filed: Jul. 22, 1992

(51) Int. Cl.7 ........................................................ G06K 9/36
(52) U.S. Cl. ........................................... 382/240; 382/251
(58) Field of Search .................................. 382/56, 50, 49, 382/41, 240, 299, 302, 303, 251; 358/136, 133, 456, 426; 348/27, 405, 401, 402; H04N 7/12

(56) References Cited

U.S. PATENT DOCUMENTS

| | | | |
|---|---|---|---|
| 3,644,890 | * 2/1972 | Matthews | 382/50 |
| 4,032,977 | 6/1977 | Liao | 358/280 |
| 4,281,344 | * 7/1981 | Mounts | 348/401 |
| 4,709,394 | * 11/1987 | Bessler et al. | 382/49 |
| 4,718,104 | * 1/1988 | Anderson | 382/41 |
| 4,723,161 | * 2/1988 | Koga | 358/136 |
| 4,821,298 | * 4/1989 | Lagadec et al. | 382/56 |
| 4,969,204 | 11/1990 | Melnychuck et al. | 382/56 |
| 5,020,120 | * 5/1991 | Weldy | 382/56 |
| 5,022,091 | * 6/1991 | Carlson | 382/49 |
| 5,048,111 | * 9/1991 | Jones et al. | 382/49 |
| 5,122,873 | * 6/1992 | Golin | 358/133 |
| 5,144,423 | * 9/1992 | Knauer | 348/402 |
| 5,172,237 | * 12/1992 | Blonstein et al. | 382/56 |
| 5,210,623 | * 5/1993 | Weldy | 358/456 |
| 5,227,789 | * 7/1993 | Barry et al. | 341/65 |
| 5,239,597 | * 8/1993 | Chung et al. | 382/233 |
| 5,293,434 | * 3/1994 | Feig et al. | 382/56 |
| 5,309,528 | * 5/1994 | Rosen et al. | 382/270 |
| 5,373,375 | * 12/1994 | Weldy | 358/523 |

* cited by examiner

*Primary Examiner*—Yon J. Couso
(74) *Attorney, Agent, or Firm*—Mark G. Bocchetti

(57) ABSTRACT

A technique for achieving essentially perfect reconstruction of an M level image by forming at least two non-dependent digital images from an original digital image and by determining the quantization levels M of the original digital image and then forming the two non-dependent images by quantizing the original M level image to two M/2 level images, one being rounded down and the other being rounded up in value. A reconstructed image, having a higher resolution than any of the non-dependent M/2 digital images is formed by combining and averaging at least two of the non-dependent images.

13 Claims, 14 Drawing Sheets

METHOD AND ASSOCIATED APPARATUS FOR ACHIEVING ADDITIONAL SIGNAL LEVEL RESOLUTION FROM A QUANTIZED DIGITAL REPRESENTATION OF AN IMAGE

TECHNICAL FIELD OF THE INVENTION

The present invention is directed to the field of digital image processing and more particularly to apparatus and methods for quantizing and/or reconstructing multi-dimensional digital image signals.

BACKGROUND OF THE INVENTION

Efficient storage, transmission, processing, compression, etc. of digital signals or images requires that the amplitude, intensity, or gray scale values of each channel be quantized to discrete levels. The more aggressive the quantization (the fewer levels used), the less the storage or the more efficient the compression, etc. However, quantization can produce artifacts that appear as noise and contouring in the reconstructed image.

While there is considerable art dealing with more effective ways to quantize (linearly or non-linearly) digital signals or images, this invention describes a method and apparatus whereby a reconstructed image can have more levels than the number of levels stored in non-dependent images (or representations).

A patent that addresses obtaining additional signal level resolution is U.S. Pat. No. 4,032,977 entitled "GRAY SCALE INTERPOLATION TECHNIQUE" by Henry H. J. Liao wherein a method and apparatus are disclosed that utilize "probabilistic information to carry out a maximum likelihood estimation process so that the gray scale information is introduced with minimum statistical error". The need for additional signal level (gray scale) resolution is recognized and addressed by utilizing adjacent data elements to form a prediction matrix.

A patent of particular interest, as it provides a method for generating the non-dependent representations that can utilize the method of this invention, is U.S. Pat. No. 4,969,204 entitled "HYBRID RESIDUAL-BASED HIERARCHICAL STORAGE AND DISPLAY METHOD FOR HIGH RESOLUTION DIGITAL IMAGES IN A MULTIUSE ENVIRONMENT" by Melnychuck et. al. This patent discloses a method wherein a hierarchical storage scheme contains lower resolution representations that do not require next lower resolution representations for display, i.e. non-dependent hierarchical representations.

The present solution to this problem of quantization artifacts, such as contouring, is achieved by encoding the digital signal or image with greater than one non-dependent representations. In a hierarchical storage scheme, a "non-dependent" representation is defined as a component of a hierarchy that does NOT require additional information (from other representations stored in the hierarchy) for display. Typically, hierarchies with residual or subband representations do not satisfy this "non-dependent" definition as any representation must be combined with a modified base image in order to create an image for display. In these cases, there is only one non-dependent representation—the base image or lowest spatial resolution image.

A practical example of an image storage scheme featuring non-dependent image representations (wherein this invention could be practiced) is the Kodak Photo CD storage scheme which features the following non-dependent files or representations:

| Spatial resolution | Representation Name |
| --- | --- |
| 512 × 768 pixels | BASE |
| 256 × 384 pixels | BASE/4 |
| 128 × 192 pixels (2 versions) | BASE/16 |

The above spatial resolution numbers are for the luma files; the Photo CD file format also includes two chroma files that are spatially subsampled at each resolution level. These files are denoted Y, C1, C2, respectively. These files or representations satisfy the "non-dependent" definition as they can be meaningfully displayed without requiring information from any of the other files or representations. A more expanded and detailed discussion of these and other Photo CD files will appear later in the text.

By applying specific encoding and reconstruction methods to these non-dependent representations, it is possible to obtain additional signal level resolution while maintaining both the non-dependent files, and the not requiring additional information for display criteria of these non-dependent files.

There are many methods that can be employed to generate a digitized, spatially sampled representation of a signal or image. These methods are well know in the art and are not detailed herein. Without loss of generality, the detailed description that follows commences with a signal or an image that is spatially or temporally sampled with each sample being digitized to one of a finite number of discrete amplitude levels. In addition, the detailed description is in terms of a single channel signal or single channel image. Those skilled in the art will recognize that this invention can be applied to multiple channels, and multiple dimensions, and can be utilized with other quantization and schemes, decomposition/encoding (such as subbands). In addition, those skilled in the art will also recognize that while the disclosure describes operating on entire images, the invention could be practiced on selected portions of an image or performed a pixel at a time.

A general description of the preferred embodiment of a Photo CD system having both dependent and non-dependent files or representations is undertaken. Then a description of the spatial decomposition for the Photo CD system is described under this section of the specification, followed by detailed examples of specific encoding and reconstruction schemes illustrating the practice of the present invention within the Photo CD hierarchical storage scheme is discussed under the section entitled "DETAILED DESCRIPTION OF THE PREFERRED EMBODIMENTS."

1. GENERAL DESCRIPTION OF A PHOTO CD SYSTEM

A Photo CD system that is the basic vehicle for the present invention is illustrated in FIG. 1. A film strip 2, having images recorded thereon, is scanned by a film scanner 3. The scanner 3 may contain electronics (not shown) for converting the scanned image into analog or digital images which represent the image generally on a pixel-by pixel basis. If the scanner's output is analog in nature the signals at its output are converted to digital signals by the use of an analog-to-digital converter (not shown). The digitized images are then forwarded to a workstation 4 for processing wherein the images are enhanced, balanced, compressed/decompressed and displayed for operator approval. The method of the present invention is enabled with the software and electronics of the workstation 4. In the preferred embodiment of the invention the digital representations of the images are in three channels identified generically as the Y, C1, and C2 channels.

Referring to FIG. 2, by utilizing the residual hierarchical format of the type disclosed in U.S. Pat. No. 4,969,204 the Y, C1, C2 channels of the starting 2048×3072 pixel image are decomposed into five images, BASE/16, BASE/4, BASE, 4BASE, and 16BASE which form an Image Pac. The 4BASE and the 16BASE images are stored as compressed residual images. For reconstruction of 4BASE and 16BASE images, the residuals plus an interpolated lower resolution image are used, therefore the 4BASE and 16BASE images are "dependent" by definition. The name BASE is given to the image that is sized for television, and the remainder are named by how they compare to the BASE.

Referring back to FIG. 1, the processed digital images (Image Pac) are then written onto a compact disk by a CD writer 5. A CD player 7 is used to read user selected images from the compact disk under user control and to reconstruct and to forward the selected images for display on, for example, a standard TV display 8 or to cause a printing of the selected image by a printer, such as a thermal printer 9. In a variant of the system (not shown) the CD player 7 may be a computer with a Photo-CD reader (CDI) incorporated therein and the images on the compact disk may be read out for display on the computer's monitor with the operator interacting with the image through appropriate computer programs.

The 16BASE digitized images from the scanner 3 have a very high resolution (2048×3072 pixels) which permits certain printers to print images that correspond to photographic quality originals. In addition, as previously stated, by manipulating the images through a hierarchical residual based scheme a number of images of differing resolution levels are generated and written on the compact disc. The lowest resolution level of 256×384 (BASE4) pixels is suitable for displaying rotated images on television. Other resolution levels are 512×768 (BASE) for standard television, 1024–1536 (4BASE) for proposed HDTV, 2048×3072 (16BASE) for prints, and 128×192 (BASE/16) for low resolution index prints that are used to catalog and quick reference the images that have been written on the compact discs.

SUMMARY OF INVENTION

In a preferred method embodiment of the present invention for quantizing a digital image signal the steps are:
a) forming a starting digital image signal having a first number of quantization levels from an input signal:
b) forming at least two non-dependent digital image signals by further quantizing the starting digital image signal of step a) to fewer levels than said first number of quantization levels, by applying said starting digital image signal as inputs to different quantizers; and
c) reconstructing the digital image signal with more levels of quantization than in step b) from at least two of the at least two non-dependent digital image signals by combining the at least two non-dependent digital image signals from step b).

In a preferred apparatus embodiment of the invention for quantizing a digital image signal there is provided; a first quantizing means having a first number of quantization levels for forming a starting digital image signal from input signals, at least two different quantizing means each receiving as inputs the starting digital image signal, for forming at least two non-dependent digital image signals by further quantizing said starting digital image signal to fewer levels than said first number of quantization levels, and a reconstruction means for reconstructing the digital image signal with more levels of quantization from at least two of the at least two non-dependent digital image signals by combining the at least two non-dependent digital image signals.

From the foregoing, it can be seen that it is a primary object of the present invention to provide an improved method and apparatus for encoding and reconstructing data with non-dependent representations.

It is another object of the present invention to provide an improved technique for reducing quantization error (or increasing the signal level resolution) in decoded images without increasing storage requirements or compromising the image quality of any of the non-dependent representations.

The above and other objects of the present invention will become more apparent when taken in conjunction with the following description and drawings wherein like characters indicate like parts and which drawings form a part of the present description.

DESCRIPTION OF THE PREFERRED EMBODIMENTS

Figure 1:
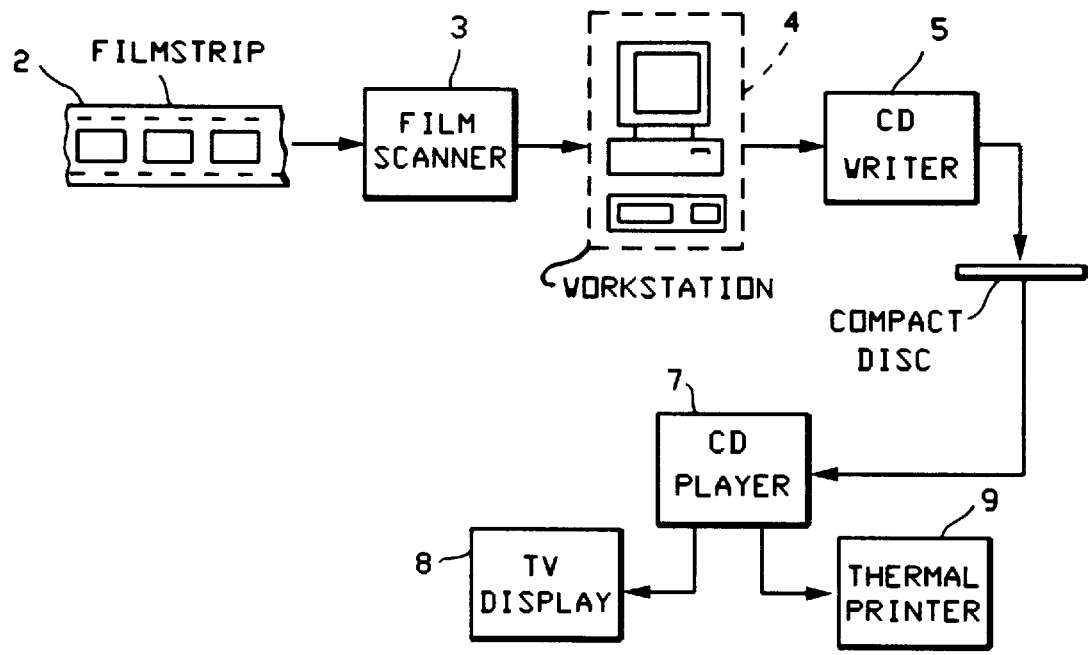
FIG. 1 is a block diagram illustrating a system for scanning film and for converting the scanned data to a hierarchy that is stored on a compact disc for future display or printing.
Figure 2:
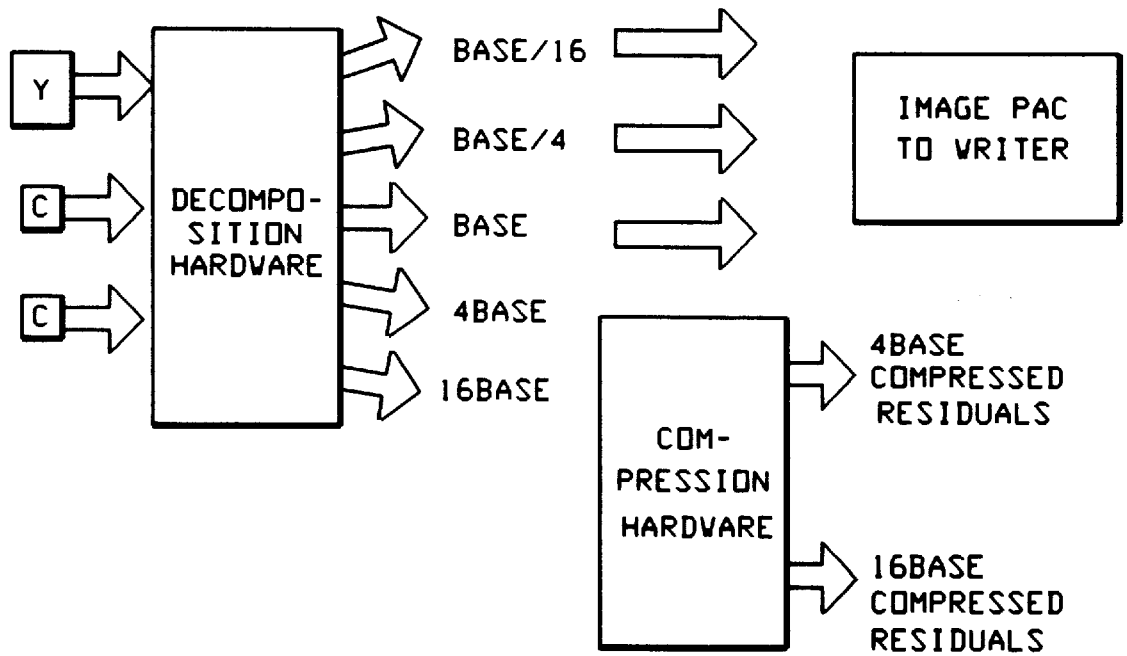
FIG. 2 is a block diagram that illustrates decomposition and compression operations for converting Y, C1, C2 inputs to an Image Pac that is stored on a Photo-CD disc.

The description that follows assumes that the original starting image has been digitized (quantized) to M levels and has been temporally and/or spatially sampled, and that at least two non-dependent representations, each with further quantization resulting in fewer than M levels, have been stored.

In order to produce additional levels upon reconstruction it is necessary to encode and store these representations systematically. For example, an M level starting signal or image, represented as integers ranging from 0 to M-1, is further quantized and stored as two M/2 level representations (Represented as even integers from 0 to M-2). A first representation (#1) of the starting image is formed (and encoded) by "truncating" or "rounding down" and representation (#2) is formed by "rounding up" as illustrated in the table below:

TABLE 1

| Representation | Further quantization from M to M/2 levels |
| --- | --- |
| M level image (Starting) | 0 1 2 3 4 5 6 7 8 9 etc. |
| M/2 level image (Representation #1) | 0 0 2 2 4 4 6 6 8 8 etc. |
| M/2 level image (Representation #2) | 0 2 2 4 4 6 6 8 8 10 etc. |

Specific examples utilizing different representations follow:

Example 1

Representations #1 and #2 (both encoded and stored with M/2 levels) have identical spatial or temporal resolution to that of the starting image (with M levels).

In this scheme, essentially perfect reconstruction of the M level image can be achieved by simple arithmetic averaging of each sample from representation #1 with the spatially or temporally corresponding sample from representation #2. This can be seen in TABLE 1 as the top row is the arithmetic average of the two bottom rows. For example, a pixel in the starting M level image having an amplitude level value of 3 would, upon further quantization, be encoded and stored with the amplitude level value of 2 in representation #1 and with the amplitude level value of 4 in representation #2. The reconstructed additional signal level resolution value for this example pixel is formed by averaging the representation #1 pixel value of 2 with the representation #2 pixel value of 4 to produce the starting image pixel value of 3 which is an additional signal level value not stored by either representation #1 or representation #2.

This example has application where only M/2 levels can be conveniently stored or in applications where multiple images, such as the two BASE/16 images in the Photo CD storage scheme are used. Other applications include, motion and stereo imagery, wherein the representations of multiple frames of image data have a high level of redundancy. It is in these areas of redundancy (i.e. little motion or change in pixel values between frames) where quantization artifacts like contouring may become apparent and could be reduced by implementing the method of this invention.

The Photo-CD storage scheme features two independent 8 bit (256 level) versions of the BASE/16 resolution image. A 9 bit (512 level) BASE/16 starting image could be further quantized to 8 bits by the two different further quantization rules to form representation #1 and representation #2. These two representations could then be used to reconstruct a 9 bit BASE/16 resolution image.

Example 2

Representation #1 (encoded and stored with M/2 levels) has the same spatial or temporal resolution as the starting image (with M levels) and representation #2 (encoded and stored with M/2 levels) has a lower spatial resolution than the starting image.

For this example near perfect reconstruction of an M level LOWER spatial or temporal resolution image is possible by applying appropriate encoding and reconstruction methods.

Reconstruction of an M level HIGHER spatial or temporal resolution image with additional signal level resolution, compared to the starting M/2 level stored representation #1 HIGHER resolution image, is also possible. While the image reconstructed by applying image processing and the knowledge of the formation process used to create representations #1 and #2 may not be numerically equal to the M level starting image, the display of this HIGHER resolution reconstructed image will exhibit less artifacts (such as contouring) than the display of the higher resolution representation #1 image.

Specifics of the encoding and reconstruction schemes for Examples 1 and 2 are detailed in sections 2, 3, and 4 that follow. The specific description and Figures that follow detail how this invention can be practiced with the non-dependent representation storage scheme utilized in the Photo CD system.

2. SPATIAL DECOMPOSITION FOR PHOTO-CD STORAGE SCHEME

Figure 3:
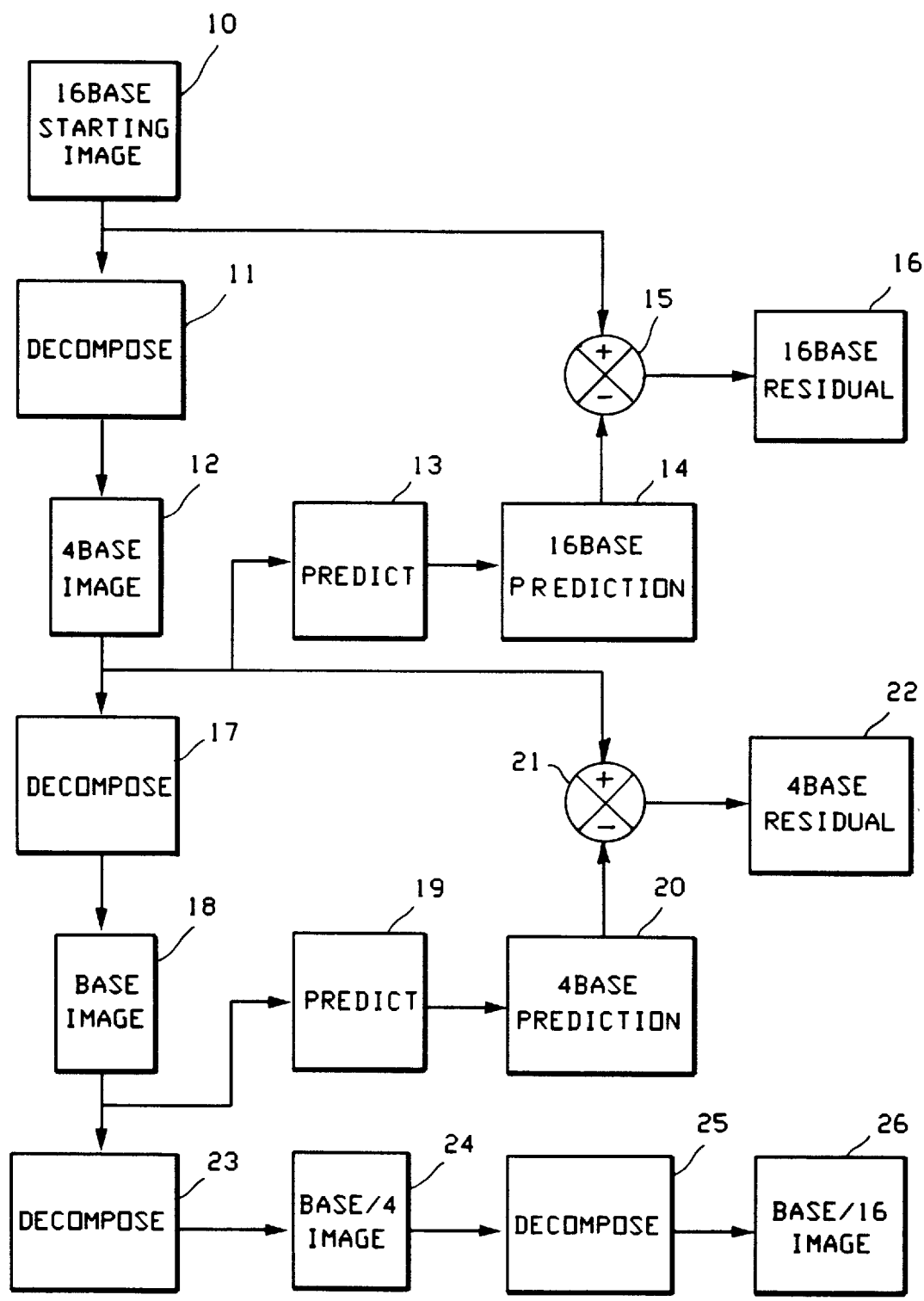
FIG. 3 is a block diagram illustrating a PRIOR ART pyramid residual image encoding method with non-dependent representations.

FIG. 3 illustrates a (prior art) decomposition scheme that can be used to form part of the Photo-CD image storage hierarchy for the luma channel. The starting 2048×3072 spatial resolution (16BASE) image 10 is decomposed by decomposition apparatus 11 to form a 1024×1536 spatial resolution (4BASE) image 12. This 4BASE resolution image 12 is processed through a prediction apparatus 13 to generate a predicted 16BASE resolution image 14 which is differenced in differencer (subtractor) 15 from the starting 16BASE resolution image 10 to form a 16BASE resolution residual image 16 that is stored, possibly after further modification for encoding advantage.

By a similar process, the 4BASE resolution image 12, is decomposed by the decomposition apparatus 17 to form a 512×768 spatial resolution (BASE) image 18 which is stored. This BASE resolution image 18 is processed through a prediction apparatus 19 to generate a predicted 4BASE resolution image 20 which is differenced (in subtractor) 21 from the 4BASE image 12 to form residual image 22 which is stored, possibly after further modification for encoding advantage.

The BASE image 18 is further decomposed by decomposition apparatus 23 to form a 256×384 spatial resolution (BASE/4) image 24 which is stored. The BASE/4 image 24 is further decomposed by decomposition apparatus 25 to form a 128×192 spatial resolution (BASE/16) image 26 which is also stored.

Note that the BASE 18, BASE/4 24, and BASE/16 26, images are not residual dependent images and are, in general, therefore non-dependent representations. While not detailed in the foregoing description, the Photo-CD storage system has 2 BASE/16 representations of each image. One representation is in the described Image Pac,the other BASE/16 representation resides in an overview browse file where BASE/16 representations for multiple images reside.

An example of a prediction apparatus that can be used for elements 13 and 19, in FIG. 3, is an interpolator that yields a higher spatial resolution output image from a lower spatial resolution input image.

Figure 4:
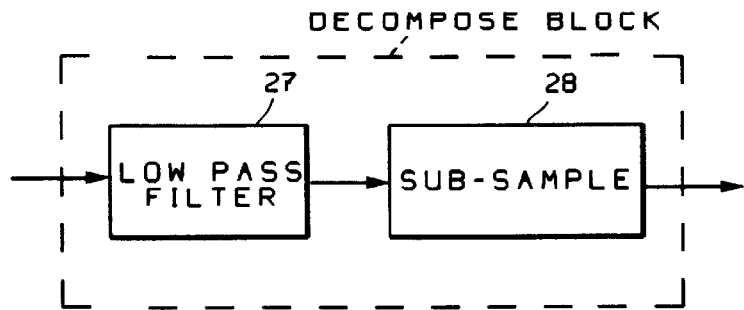
FIG. 4 is a block diagram of the decompose block of FIG. 3.

FIG. 4 illustrates an example decomposition apparatus that may be used as the decompose blocks 11, 17, 23, and 25, of FIG. 3, which apparatus includes a low pass filter 27, and a sub-sampler 28. A simpler decomposition apparatus would use only the sub-sampler 28.

FIG. 3 and the preceding description teach the spatial decomposition and prediction operations needed to form the Photo CD storage hierarchy. The preferred embodiment of this invention builds on this decomposition scheme by quantizing, prior to storage, the non-dependent image representations (BASE, BASE/4, and BASE/16 images) in a way that provides the opportunity to generate more signal level resolution.

3. EXAMPLE QUANTIZATION ENCODING FOR PHOTO-CD HIERARCHICAL STORAGE SCHEME

Figure 5:
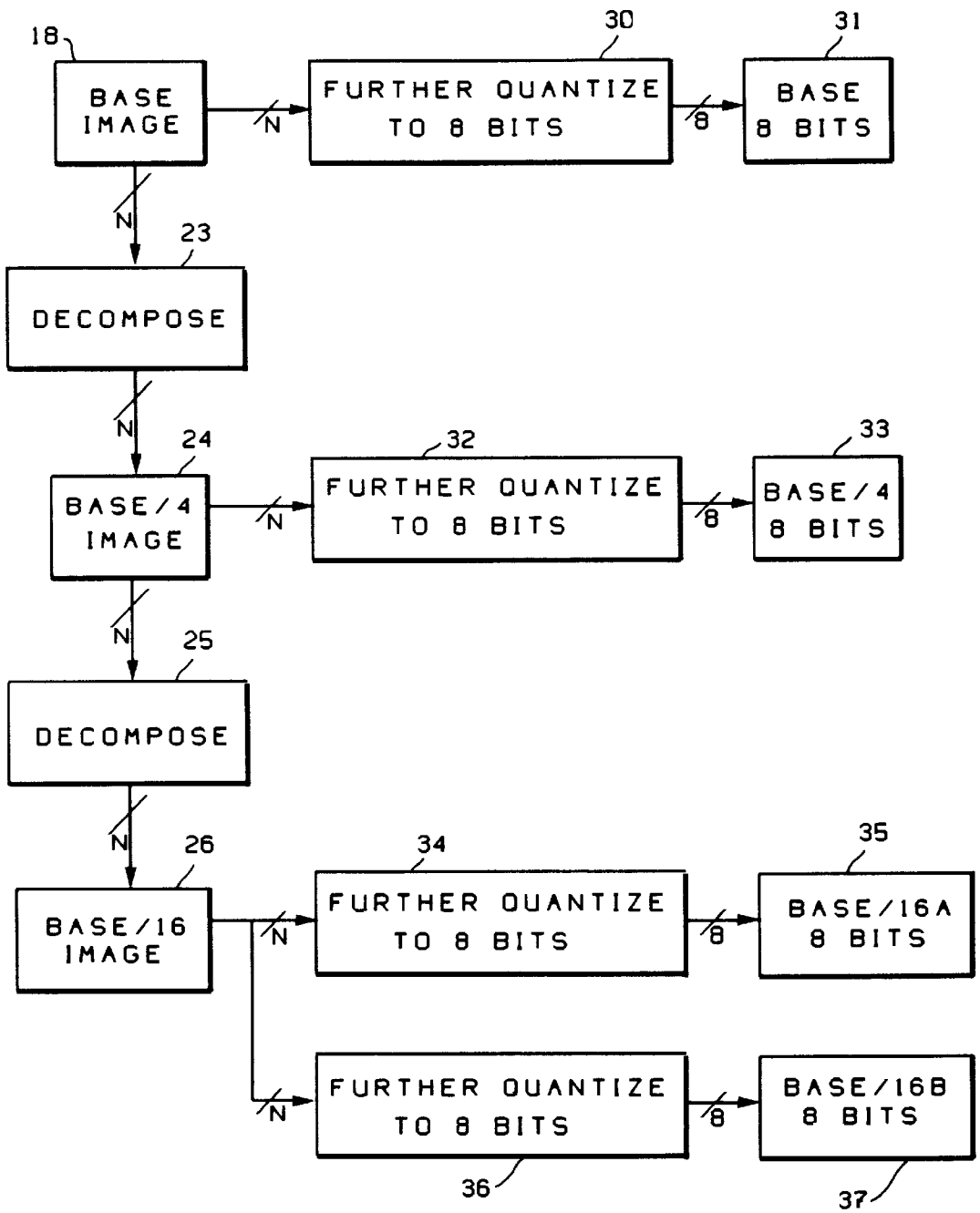
FIG. 5 is a block diagram illustrating the further quantizing of the BASE, BASE/4, and BASE/16 images of FIG. 3.

FIG. 5 is an extension of FIG. 3 and illustrates one quantization encoding scheme of the present invention. The BASE resolution image 18 which has been quantized (by digitizing an analog image signal) to N bits ($2^N$ signal levels) where N>8, typically 10 or 12 bits, is further quantized in block 30 to form an 8 bit BASE resolution image 31 that is stored. The BASE resolution image 18 is also decomposed by a decomposition apparatus 23 to form a BASE/4 resolution image 24 with N bits ($2^N$ signal levels). The BASE/4 resolution image 24 is further quantized in quantizer 32 to form an 8 bit BASE/4 resolution image 33 that is stored. The BASE/4 resolution image 24 is decomposed by a decomposition apparatus 25 to form a BASE/16 resolution image 26 with N bits ($2^N$ signal levels). The BASE/16 resolution image 26 is further quantized in quantizer 34 to form a first 8 bit BASE/16 resolution (BASE/16A) image 35 which is stored. Additionally, the BASE/16 resolution image 26 is further quantized in quantizer 36 to form a second 8 bit BASE/16 resolution (BASE/16B) image 37 which is stored.

In order to produce additional levels upon playback (reconstruction of the image for viewing or printing) it is necessary to utilize different quantizers with at least two of these non-dependent representations (BASE, BASE/4, BASE/16A, and BASE/16B). TABLE 2 demonstrates one option for further quantizing from 9 to 8 bits that can be utilized by this invention to apply a specific reconstruction that produces additional signal level resolution:

TABLE 2

| Further quantization from 9 to 8 bits | |
|---|---|
| N = 9 Bit (Starting) | 0 2 3 4 5 6 7 8 . . . 509 510 511 |
| 9-8 Bit A (Stored) | 0 2 2 4 4 6 6 8 8 . . . 510 510 510 |
| 9-8 Bit B (Stored) | 0 0 2 2 4 4 6 6 8 . . . 508 510 510 |

Note that the 9 bits are represented by all integers from 0 to 511 and that the 8 bits are represented by even integers from 0 to 510. Note also that both 8 bit representations of the 9 bits are equally valid in terms of representing the original 9 bits.

The arrangement of these quantizers can be considered to be overlapping, or quantizers whose quantization bins overlap. Also note that the average of the two 8 bit quantization values is the 9 bit value. This overlapping-average feature helps explain why the reconstruction processes described below provides the desired increased signal level resolution, particularly in areas dominated by low spatial or temporal frequency information where the contouring quantization artifacting is most obvious.

This further quantization scheme can be applied as follows:

Further quantization of the 9–8 Bit A can be achieved by utilizing an additional quantizer 30 in forming the stored BASE image 31 and further quantization of the 9–8 Bit B is achieved by the quantizer 32 in forming stored BASE/4 image 33. Using this further quantization scheme provides the opportunity to reconstruct 9 bit BASE and BASE/4 images.

In a similar manner, further quantization of 9–8 Bit A is accomplished by quantizer 34 in forming stored BASE/16A image 35 and further quantization of 9–8 Bit B is accomplished by quantizer 36 in forming stored BASE/16B image 37. Using this further quantization scheme provides the opportunity to rigorously reconstruct a 9 bit BASE/16 image.

An option for further quantizing from 10 to 8 bits that can be utilized by this invention to apply specific reconstruction to produce additional signal level resolution is shown below:

TABLE 3

| Further quantization from 10 to 8 bits | |
|---|---|
| N = 10 Bit (Starting) | 0 2 3 4 5 6 7 8 . . . 1020 1021 1022 1023 |
| 10-8 Bit A (Stored) | 0 0 4 4 4 4 8 8 8 . . . 1020 1020 1020 1020 |
| 10-8 Bit B (Stored) | 0 0 0 0 4 4 4 4 8 . . . 1020 1020 1020 1020 |
| 10-8 Bit C | 0 4 4 4 4 8 8 8 8 . . . 1020 1020 1020 1020 |
| 10-8 Bit D (Stored) | 0 0 0 4 4 4 4 8 8 . . . 1020 1020 1020 1020 |

Note that the 10 starting bits are represented by all integers from 0 to 1023 and that the stored 8 bits A, B, C, and D are represented by every fourth integer from 0 to 1020. Again note that all four 8 bit representations of the 10 bits are equally valid in terms of representing the original 10 bits and that the configuration of the quantizers forms a set of four overlapping quantizers.

This further quantization scheme may be applied as follows:

Further quantization of 10–8 Bit A is performed by quantizer 30 in forming the stored BASE image 31 and further quantization of 10–8 Bit B is performed by quantizer 32 in forming the stored BASE/4 image, 33. Further quantization of 10–8 Bit C is performed by quantizer 34 in forming stored BASE/16A image 35 and further quantization of 10–8 Bit D is performed by quantizer 36 in forming stored BASE/16B image 37.

Using this further quantization scheme provides the opportunity to reconstruct 9 bit BASE and BASE/4 images and a 9 bit BASE/16 image, and through repeated application of the reconstruction techniques, reconstruct 10 bit BASE, BASE/4, and BASE/16 images.

4. EXAMPLE RECONSTRUCTION SCHEMES TO OBTAIN ADDITIONAL SIGNAL LEVEL RESOLUTION

In the following figures and disclosure, various schemes for reconstructing additional signal level resolutions are described. Those skilled in the art will recognize that while all variations and their specific implementations may not be detailed, sufficient example is provided to illustrate how the above described specific further quantization technique is merged with reconstruction techniques to achieve images having signal level resolutions greater than the signal level resolutions of the stored non-dependent image representations.

Figure 6:
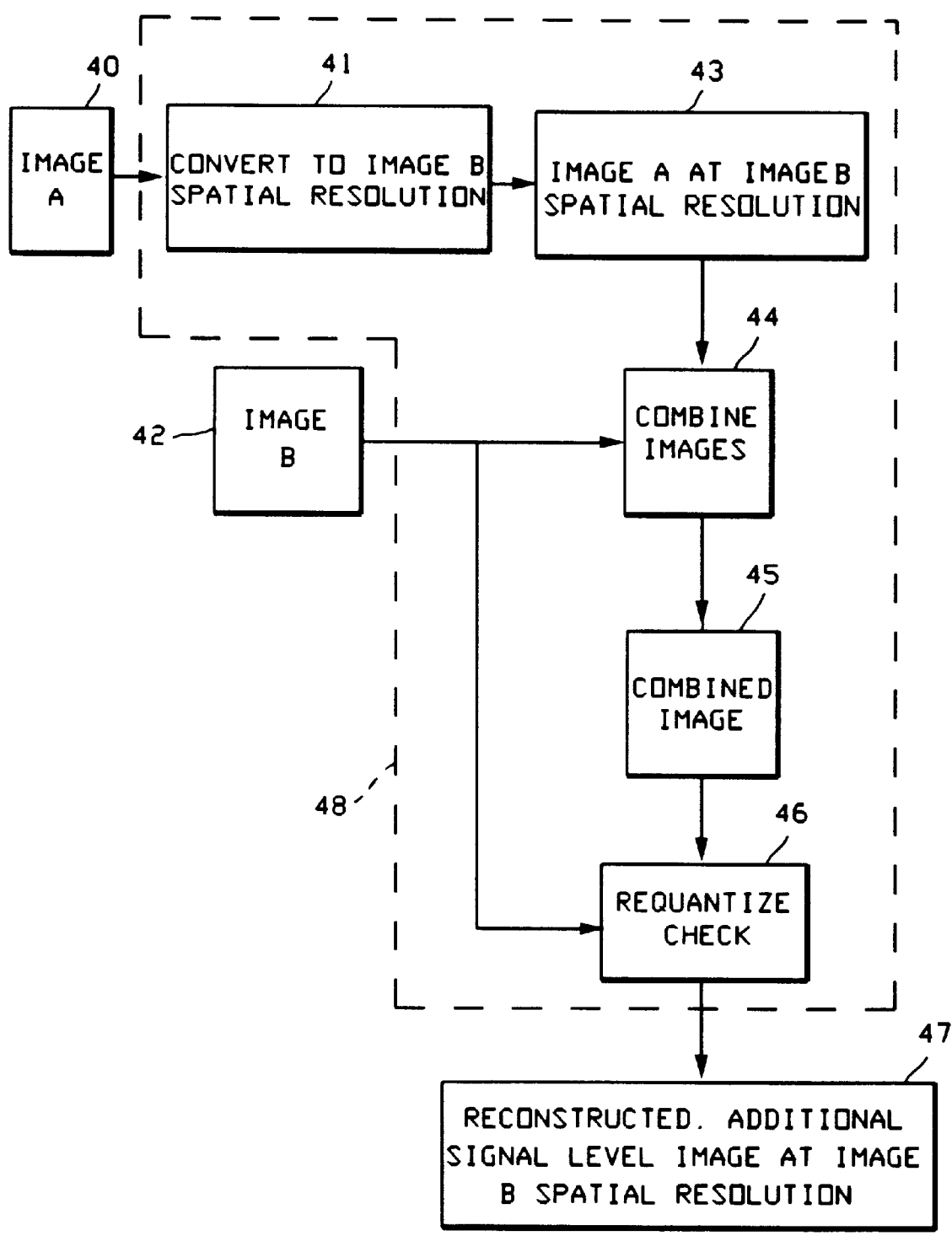
FIG. 6 is a block diagram of the generic functional steps for a reconstruction scheme.

FIG. 6 illustrates the generic functional steps of a reconstruction scheme 48 that utilizes more than one of the specifically further quantized non-dependent representations to reconstruct additional signal level resolution information at the spatial resolution of one of the non-dependent representations. Subsequent Figures provide additional description of these functional steps.

A first non-dependent specifically quantized representation, Image A in block 40, is converted in block 41, to the same spatial or temporal resolution as a second non-dependent specifically quantized representation, Image B in block 42, to form the spatially converted Image A in block 43. The spatially converted Image A of block 43, is combined in block 44, with Image B from block 42, to form a combined, additional signal level resolution Image 45. The combined, additional signal level Image 45 and Image B from block 42, are inputted to a requantization check step 46 to insure that the fully reconstructed additional level Image 47, upon further requantization, will yield the same Image B that is in block 42.

The spatial converting step, 41, may be a decomposition or prediction process depending on the spatial resolutions of Image A and Image B. Should Image A and Image B have the same spatial resolution, then this step is eliminated. For this case with equal spatial resolution images, the combine images step 44 could be simple averaging. The requantization check step 46 could be eliminated if the combination step 44 is one that insures that no pixel value of the combined image fails, upon further requantization, to yield the corresponding pixel value of Image B.

Figure 7:
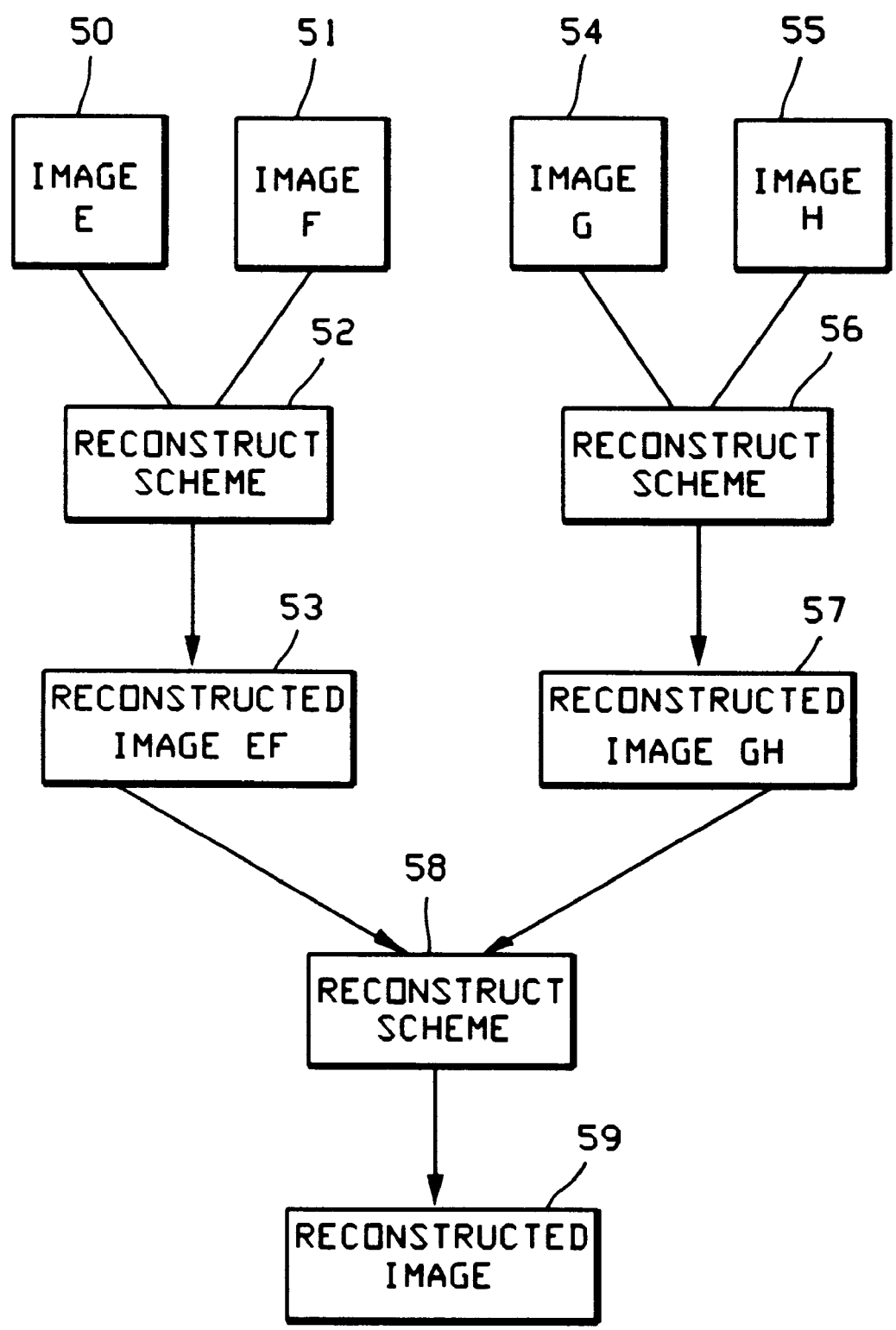
FIG. 7 is a block flow diagram illustrating the multiple stage application of the generic functional steps of FIG. 6.

FIG. 7 illustrates a multiple stage-wise application of the generic functional steps of FIG. 6. A first non-dependent specifically further quantized representation Image E in block 50, and a second non-dependent specifically further quantized representation Image F in block 51, are inputted to reconstruction scheme in block 52, to form a reconstructed Image EF in block 53. In a similar manner, a third non-dependent specifically further quantized representation Image G in block 54, and a fourth non-dependent specifically further quantized representation Image H in block 55, are inputted to a reconstruction scheme in block 56, to form reconstructed Image GH in block 57. The stage-wise application of the process shows Image EF and Image GH being inputted to a reconstruction scheme in block 58 to form a reconstructed Image 59.

Figure 8:
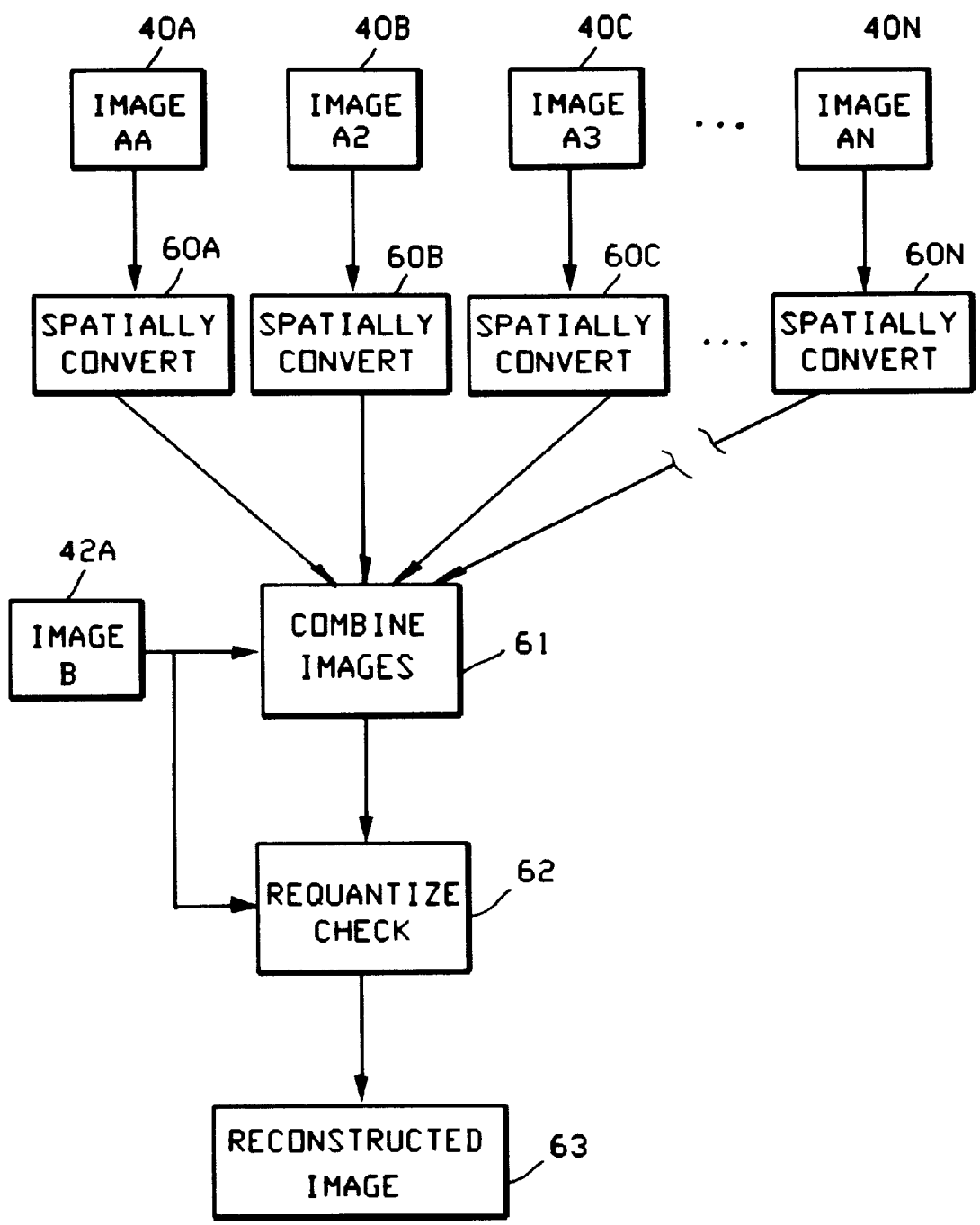
FIG. 8 is a block flow diagram illustrating an extension of the functional steps of FIG. 6 to more than two non-dependent specifically quantized representations.

FIG. 8 illustrates an extension to the technique of FIG. 6 showing more than 2 non-dependent specifically further quantized representations, 40A through 40N and an Image B in block 42A for reconstructing additional signal level resolution information at the spatial resolution of one of the non-dependent representations, for example, Image 42A. The images in blocks 40A through 40N are spatially converted to form the images stored in blocks 60A through 60N which are at the same spatial resolution as Image B in block 42A. The spatially converted images of 60A through 60N and Image B are combined to form an additional signal level combined Image 61. The combined, additional signal level Image 61 and Image B are inputted to a requantization check step 62 to insure that the fully reconstructed additional level image 63, upon further requantization, would yield the same Image B that is in block 42A. The method of FIG. 8 can also be utilized to combine multiple images from a motion sequence or from stereo image representations to reduce quantization artifacts in image areas that are substantially similar so when they are combined to form additional signal level resolution, they successfully requantize to the original stored value.

Figure 9:
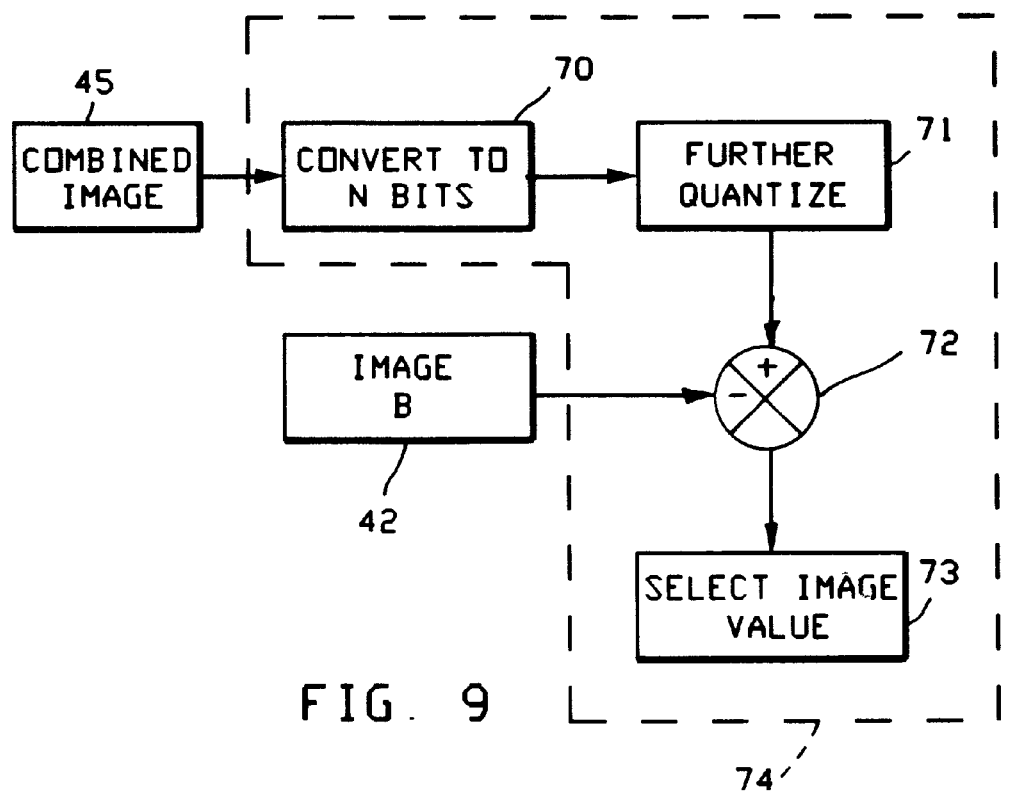
FIG. 9 illustrates in block diagram form a requantization process.

FIG. 9 illustrates a requantization process 74. A combined, additional signal level image in block 45, is converted in block 70, to N bits, the starting number of bits that are inputted for further quantization in block 71. The further quantization of block 71 is the same as that used for original further quantization of the image applied before storage. For example, further quantization, (block 30, FIG. 5) would be used in block 71, when a BASE resolution image with additional signal level resolution is being reconstructed (See FIG. 5). Likewise, further quantization (block 32, FIG. 5) would be used in block 71, when a BASE/4 resolution image with additional signal level resolution is being reconstructed. The output of block 71, is differenced, in the subtractor 72, with Image B, from block 42, and represented with the same number of bits (levels) as the output of block 71. The difference from 72, is inputted to a logic-selector process in a select Image value block 73, and is used to select from two or more additional signal level values to form the reconstructed additional level Image at Image B resolution, represented by block 47, in FIG. 6.

Figure 10:
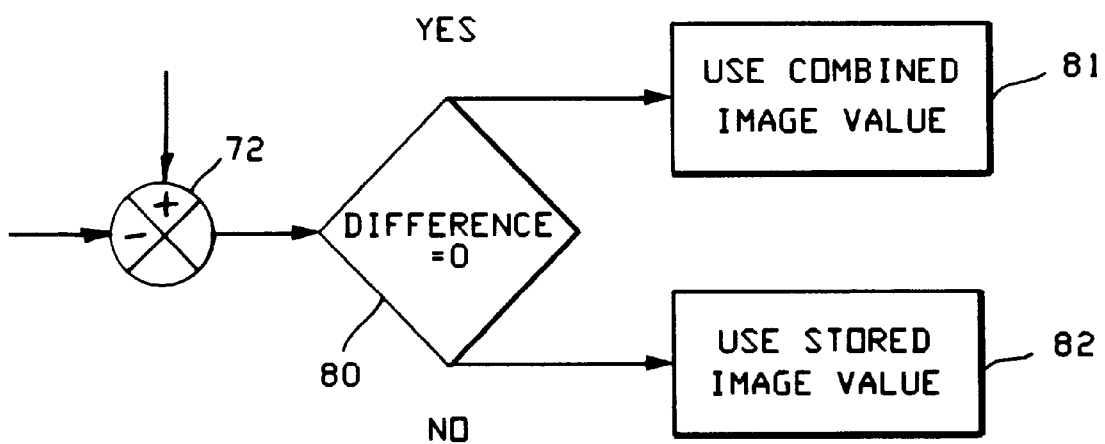
FIG. 10 illustrates in further detail a logic selection that may be used in FIG. 9.
Figure 11:
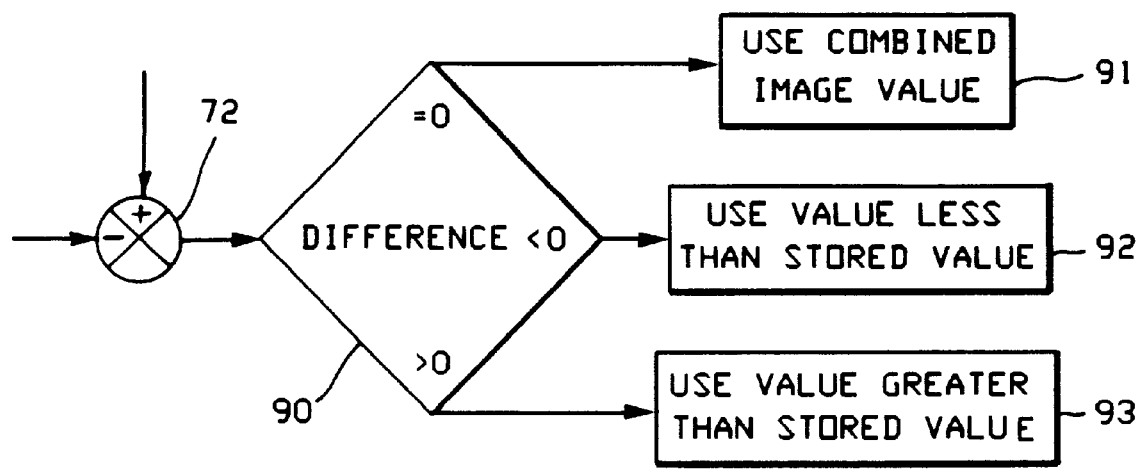
FIG. 11 illustrates another logic system that may be used in FIG. 9.

FIGS. 10 and 11 illustrate the details of the logic and selection process, performed by block 73.

In FIG. 10 the difference signal from subtractor 72, is tested for a zero value in logic block 80. If the difference equals zero, logic block 80 selects the use of the value from the combined Image in block 81. An example of a combined image would be the combined image 45 from FIG. 6 or the combined image 61 from FIG. 8. If the difference does not equal zero, the logic block 80 selects the value of the stored Image block 82, which has stored therein an Image B representation at the same bit depth (for example a left shifted version of Image B is contained in block 42A from FIG. 5 or 6) as the combined image stored in block 81.

In FIG. 11, the difference signal from 72, is tested for a zero value in logic block 90. If the difference equals zero, logic block 90 selects the use of the value from the combined Image block 91. An example of combined image would be the combined image 45 from FIG. 6 or the combined image 61 from FIG. 8. If the difference is less than zero, a stored value in block 92, (less than or equal to the stored Image, 92, which upon further requantization yields the Image B value, in block 42A from FIG. 5 or 6) is selected. If the difference is greater than zero a value (greater than or equal to the stored Image that will yield the Image B value, in block 42A from FIG. 5 or 6) is selected. The method in FIG. 11 selects a value from the high value portion of the further quantization bin if the combined image fails, on the high side, to further requantize to the stored image value. In a similar manner, the method in FIG. 11 selects a value from the low value portion of the further quantization bin if the combined image fails, on the low side, to further requantize to the stored image value. This selection strategy is consistent with the assumption that if the estimate from the combined image is out of bounds high or low of the further requantization bin, then it is most likely that the true value fall near the bin boundary in the same high or low direction.

Additional complexity in the requantization check and selection processes can be utilized. For example, higher bit representations of the combined image of block 45, and the stored image of block 42, can be differenced in subtractor 72. This provides additional information to the selection logic to better select a value from possible higher signal resolution values which upon further quantization will yield the Image B value. In addition, spatial neighborhood information and other information may improve the selection process.

FIGS. 6, 7, 8, 9, 10, and 11 have generically illustrated this invention. The following figures detail how this invention can be practiced with images encoded into the Photo CD image storage scheme. In these figures, each operational block assumes that the image that results from the operation is forwarded to the next operational block. Those skilled in the art will recognize that many of these operations need not be applied to the entire image before proceeding through subsequent blocks as many of these operations can be done at the sample or pixel level. Also, those skilled in the art will recognize that many of these operations could be conveniently combined. The preferred embodiment is presented with this level of detail to fully disclose the invention.

Figure 12:
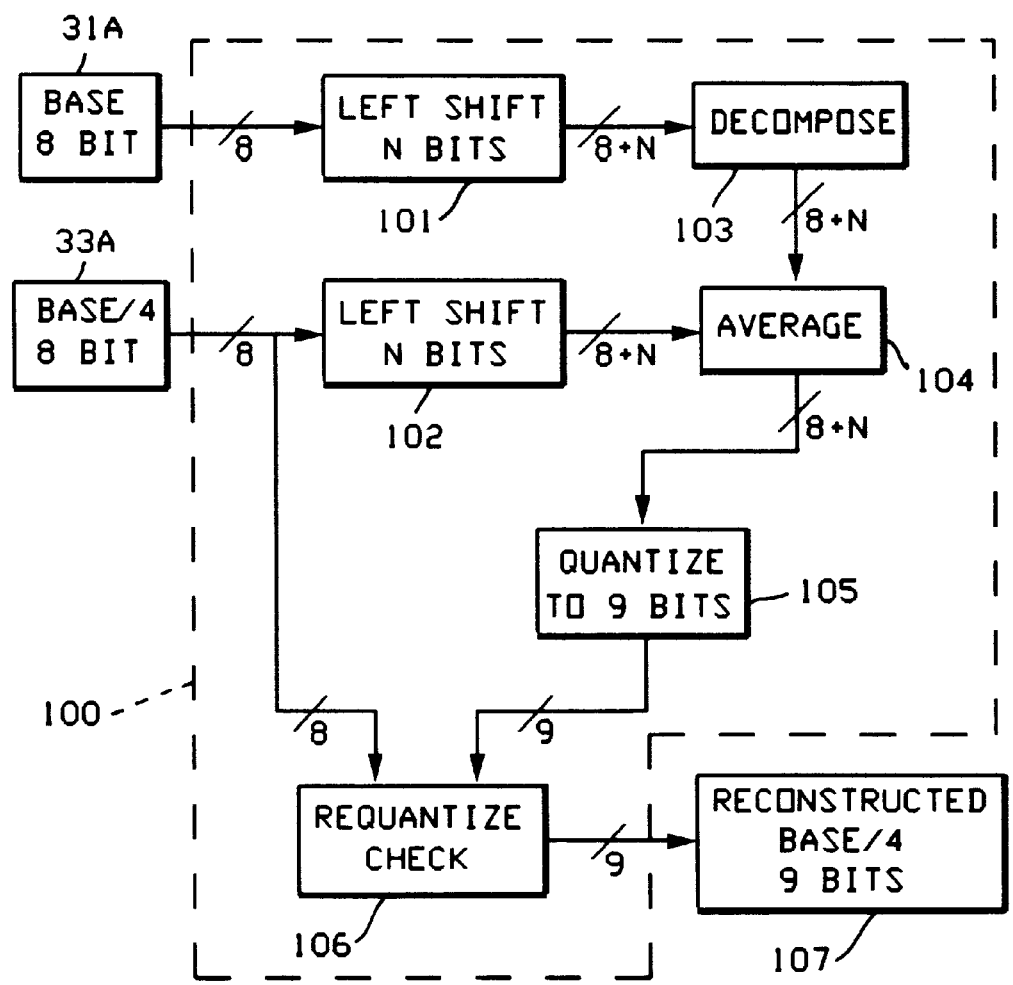
FIG. 12 illustrates in block diagram form a reconstruction scheme for generating a 9 bit BASE/4 image from an 8 bit BASE image and an 8 bit BASE/4 image.

FIG. 12 illustrates a reconstruction scheme, 100, that can be used to generate a 9 bit BASE/4 Image 107 from an 8 bit BASE Image, in block 31A, and an 8 bit BASE/4 Image, in block 33A. Utilizing the process of FIG. 5, the 8 bit BASE Image 31A, is formed with further quantizer 9–8 Bit A and the 8 bit BASE/4 Image 33A, is formed with further quantizer 9–8 Bit B. The BASE Image 31A, is left-shifted N bits to form an 8+N bit level image, in block 101, to provide additional precision and allow for the ultimate generation of addition signal level resolution or bits. For the same reasons, the BASE/4 Image 33A, is also left shifted N bits to form 8+N bit level Image, in block 102. The 8+N bit level BASE resolution image, from block 101 is decomposed, in block 103, preferably by the same decomposition process as used in block 18, to provide an image with BASE/4 resolution. The BASE/4 resolution images, in blocks 102 and 103, are combined to form an averaged BASE/4 resolution Image, in block 104, which is further quantized to form a 9 bit Image in block 105. The combined and further quantized Image in block 105, and the stored BASE/4 Image from block 33A, are inputted to a requantize check process (like 74 in FIG. 9), block 106, to insure that the reconstructed additional level Image, in block 107, upon further requantization, would yield the stored BASE/4 Image 33A.

Figure 13:
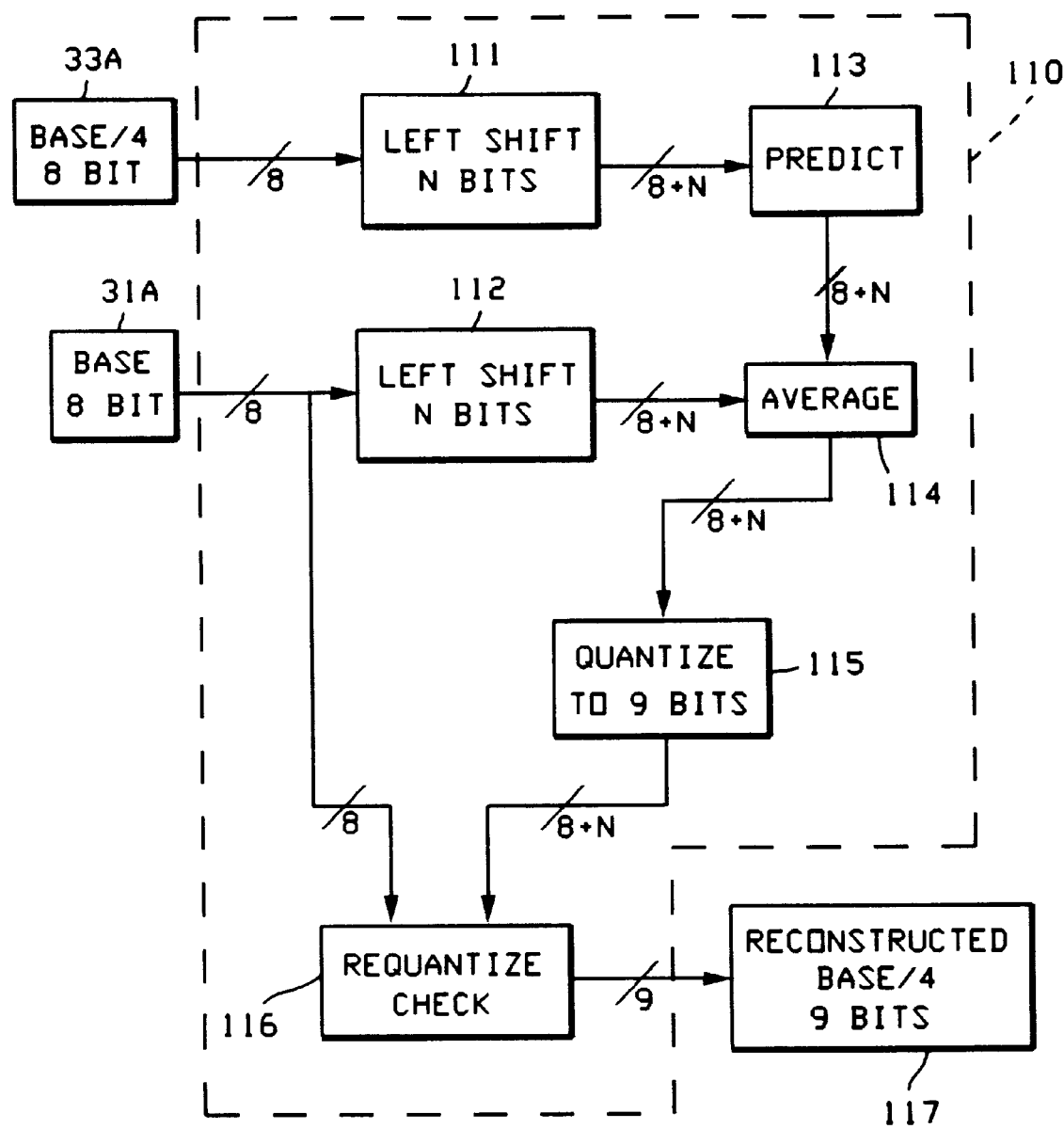
FIG. 13 illustrates in block diagram form a reconstruction scheme for generating a 9 bit BASE image from an 8 bit BASE/4 image and an 8 bit BASE image.

FIG. 13 illustrates a reconstruction scheme 110, that can be used to generate a 9 bit BASE Image 117 from an 8 bit BASE/4 Image in block 33A and an 8 bit BASE Image 31 in block 31A. Again assuming that the 8 bit BASE Image 31A, is formed with further quantizer 9–8 Bit A and that the 8 bit BASE/4 Image, 33A, is formed with further quantizer 9–8 Bit B, the BASE/4 image in block 33A, is left-shifted N bits to form an 8+N bit level image, in block 111, to provide additional precision and to allow for the ultimate generation of addition signal level resolution or bits. For the same reasons, the BASE Image 31A, is also left shifted N bits to form 8+N bit level Image, in block 112. The 8+N bit level BASE/4 resolution image, from block 111, is increased in spatial resolution through a prediction process to provide an image with BASE resolution, in block 113. The BASE resolution images, in blocks 112 and 113, are combined to form an averaged BASE resolution Image, in block 114, which is further quantized in block 115 to form an Image with the desired 9 bits. The combined and further quantized Image from 115, and the stored BASE Image 31A are inputted to a requantize check step in block 116, to insure that the resultant reconstructed additional level image, upon further requantization, will yield the stored BASE Image in block 31A.

Figure 14:
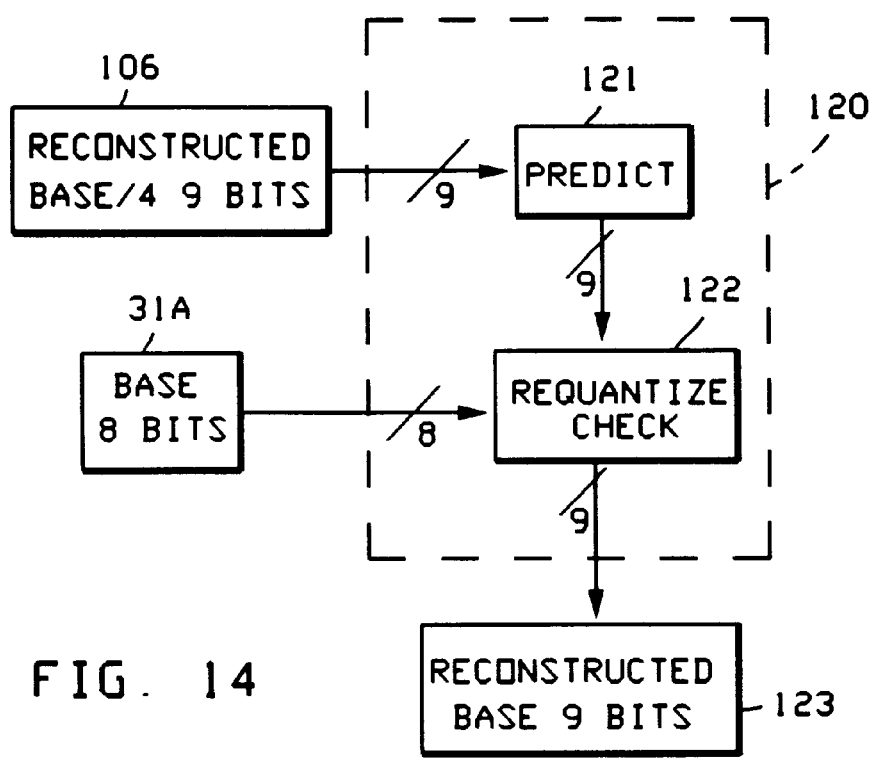
FIG. 14 illustrates in block diagram form an alternate reconstruction scheme that can be used to generate a 9 bit BASE image.

FIG. 14 illustrates an alternate reconstruction scheme 120, that can be used to generate a 9 bit BASE Image 123. The reconstructed BASE/4 9 bit Image, from block 106, is increased in spatial resolution through a prediction process to provide a 9 bit image with BASE resolution, in block 121. The stored 8 bit BASE resolution image of block 31A, and the predicted 9 bit BASE Image, from block 121, are inputted to a requantize check step, in block 122, to insure that the fully reconstructed additional level Image 123, upon further requantization, will yield the stored BASE Image 31A.

Figure 15:
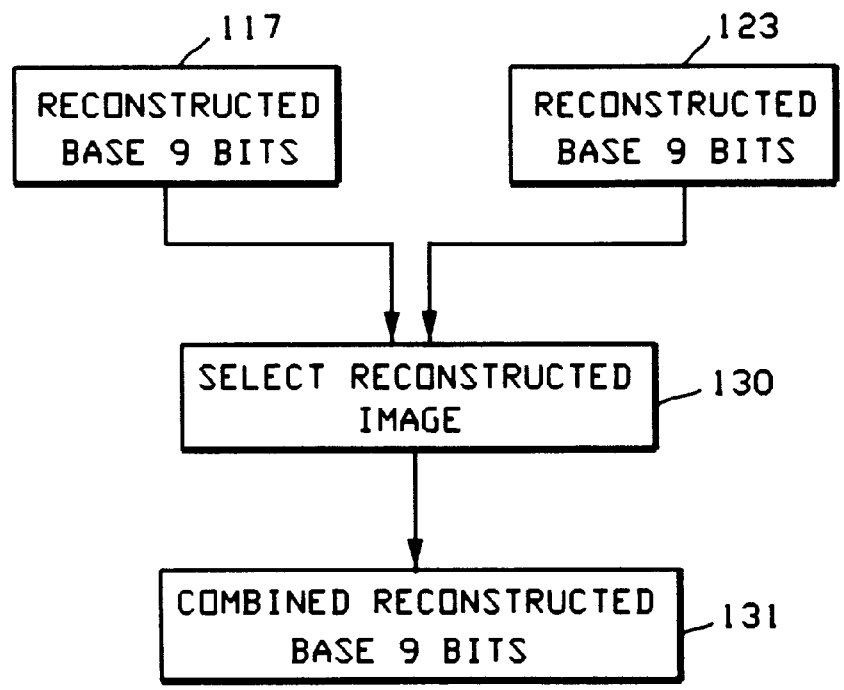
FIG. 15 illustrates in block diagram form a reconstruction scheme that combines the reconstructed 9 bit BASE images from FIG. 13 and FIG. 14.

FIG. 15 illustrates a combination of the schemes from FIGS. 13 and 14.

Typically, the decomposing and prediction processes used in forming the hierarchical storage scheme results in pixel center locations in the BASE resolution image that are also present in the BASE/4 image. For example, the pixel center locations that result from subsampling the BASE image to form the BASE/4 image are "present" in both images. Alternatively, this common pixel center location can be described as having pixel center locations in phase. A pixel center location criteria is used to select the reconstruction scheme from either FIG. 13 or 14. The 9 bit reconstructed additional signal level image 117, and the 9 bit reconstructed additional signal level image, 123, are inputted to a selector 130. At pixel center locations in the BASE resolution image that are also present, selector 130, selects the 9 bit reconstructed additional signal level image 117, and at all other locations, the selector, 130, selects the 9 bit reconstructed additional signal level image 123. The selected pixel location values are combined to form the reconstructed additional level 9 bit BASE Image 131.

Figure 16:
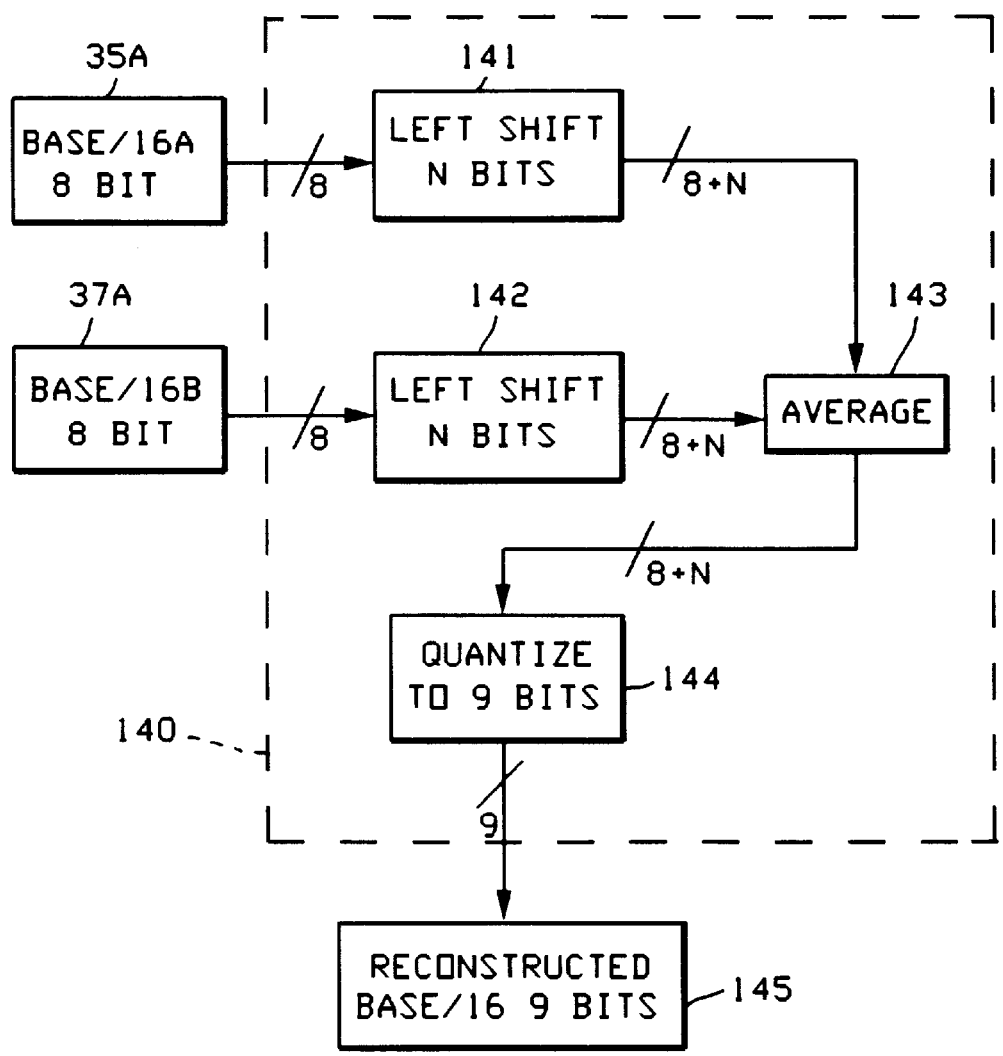
FIG. 16 illustrates in block diagram form a reconstruction scheme that can be used to generate a 9 bit BASE/16 image from two 8 bit BASE/16 images.

FIG. 16 illustrates a reconstruction scheme 140 that can be used to generate a 9 bit BASE/16 Image 145 from an 8 bit BASE/16A, Image in block 35A, and an 8 bit BASE/16B, Image in block 37A. Assume that the 8 bit BASE/16A, Image 35A, was formed with further quantizer 9–8 Bit A and that the 8 bit BASE/16B Image, 37A, was formed with further quantizer 9–8 Bit B. The BASE/16A image 35A, is left-shifted N bits to form an 8+N bit level image, in block 141, and the BASE/16B Image 37A, is left shifted N bits to form 8+N bit level Image, in block 142. The BASE/16 resolution images, from blocks 141 and 142, are combined to form an averaged BASE/16 resolution Image in block 143, which is further quantized in block 144 to form an image with the desired 9 bits, 145. This simple averaging of like spatial resolution images obviates the need for the requantization check step, i.e. the average value always will, upon further quantization, yield the input image corresponding to chosen further quantization. Therefore the reconstructed BASE/16 resolution image 145, is identical to the further quantized to 9 bit image, in block 144.

Figure 17:
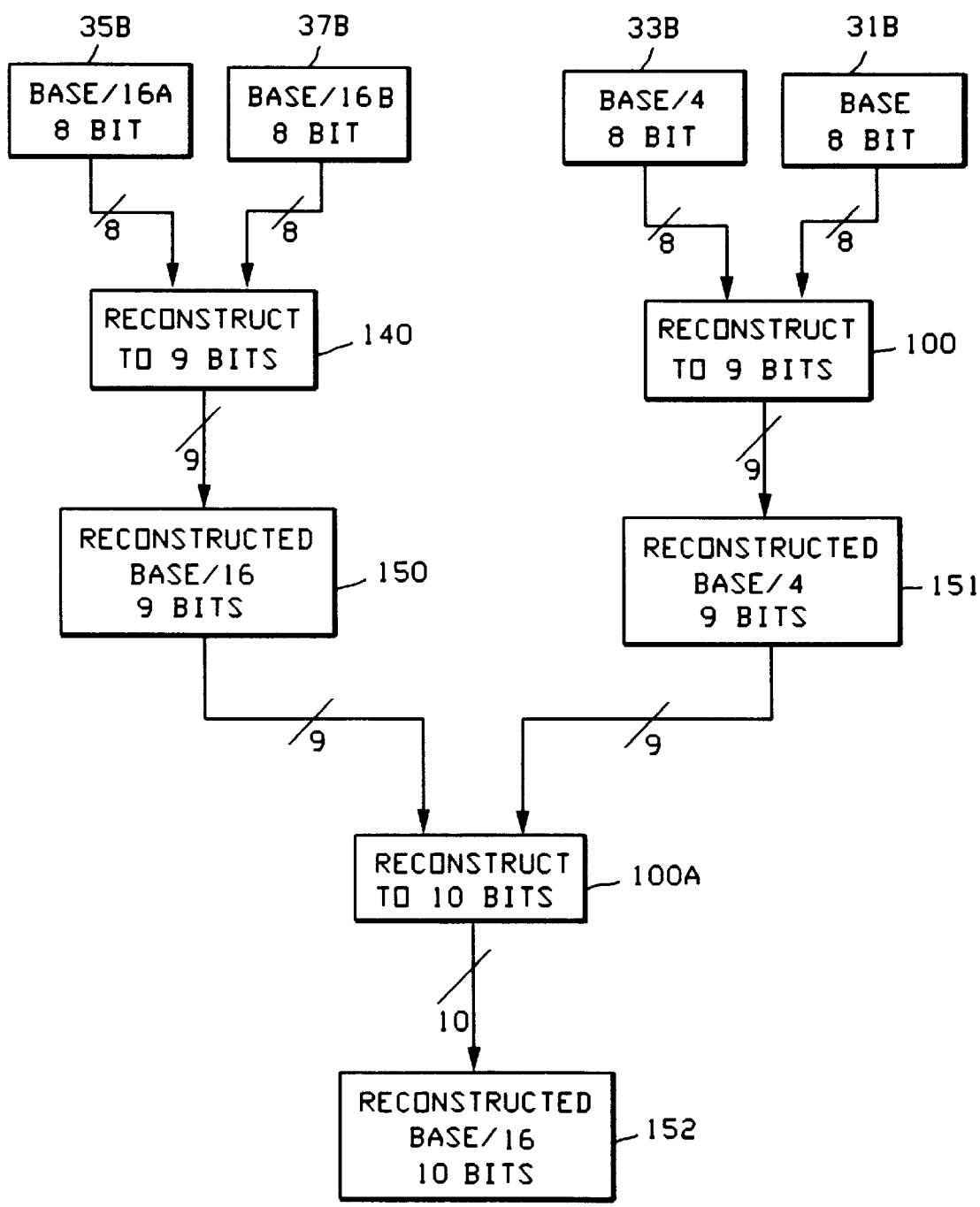
FIG. 17 illustrates in block diagram form a specific implementation of a FIG. 7 like stage-wise application of the invention that can be used to generate a 10 bit BASE/16 image.

FIG. 17 illustrates a specific implementation of a FIG. 7 like stage-wise application of this invention that could be used with images encoded into the Photo CD storage scheme. A 10 bit BASE/16 spatial resolution image 152 is reconstructed from 8 bit BASE/16A Image 35B, BASE/16B Image 37B, BASE/4 Image 33B, and BASE Image 31B. The 8 bit BASE/16A Image 35B, is formed with further quantizer 10–8 Bit C and the 8 bit BASE/16B Image 37B, is formed with further quantizer 10–8 Bit D. The 8 bit BASE/4 Image 33B, is formed with further quantizer 10–8 Bit B and the 8 bit BASE Image 31B, is formed with further quantizer 10–8 Bit A.

The BASE/16 spatial resolution images 35B and 37B are inputted to a reconstruction process in block 140 to produce a 9 bit, additional signal level BASE/16 spatial resolution image, in block 150. The BASE/4 spatial resolution image 33B, and the BASE spatial resolution image 31B, are inputted to a reconstruction process in block 100 to produce a 9 bit, additional signal level BASE/4 spatial resolution image, in block 151. The 9 bit BASE/16 spatial resolution image, from block 150, and the 9 bit BASE/4 spatial resolution image, from block 151, are inputted to a reconstruction process in block 100A to produce a 10 bit, additional signal level BASE/16 spatial resolution image 152. The reconstruction process, of block 100A, is equivalent to the reconstruction process, of block 100, with the exception that the reconstruction process, of block 100A, yields a 10 bit output from two 9 bit inputs whereas the reconstruction process, of block 100, yields a 9 bit output from two 8 bit inputs.

Figure 18:
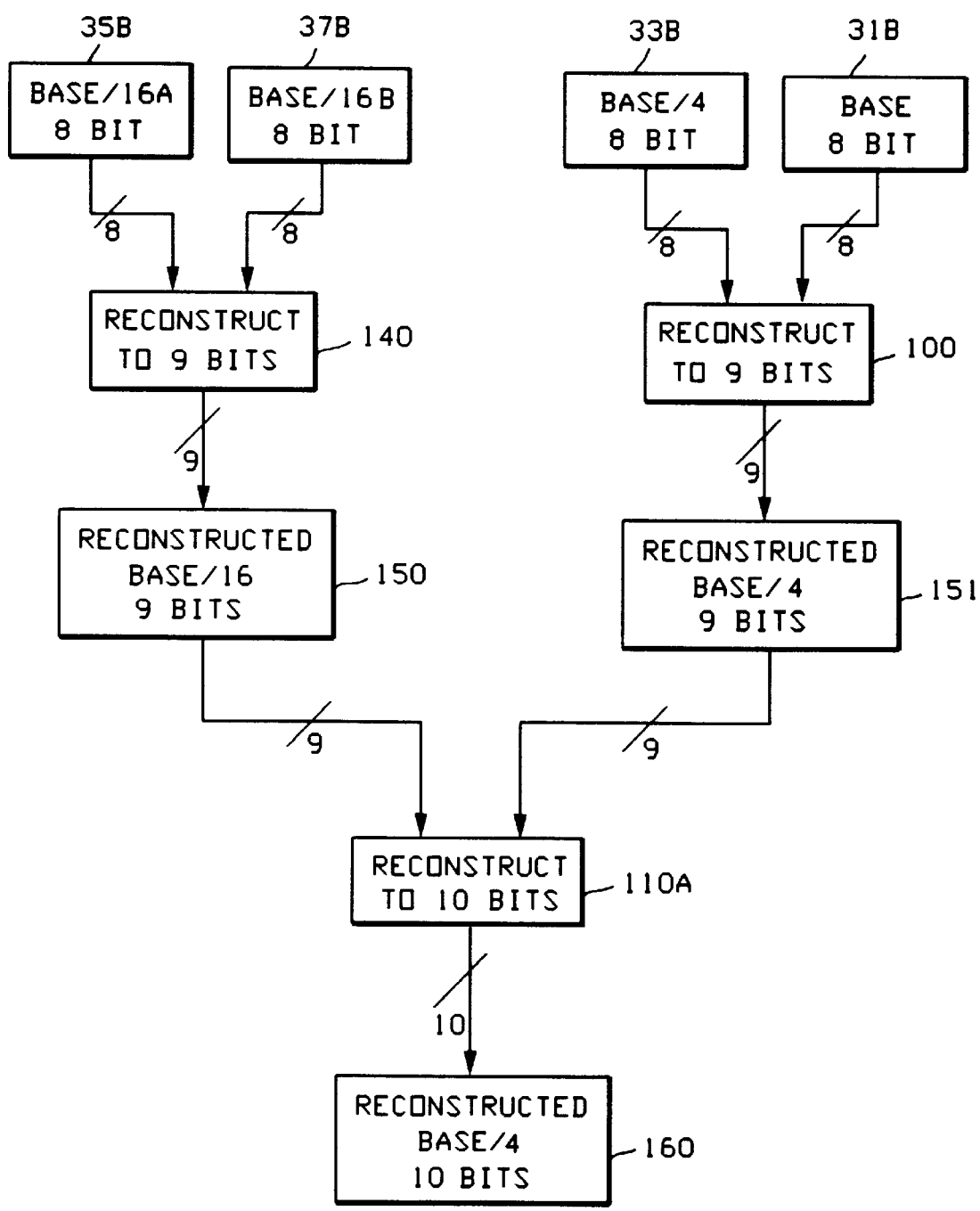
FIG. 18 illustrates in block diagram form another specific implementation of a FIG. 7 like stage-wise application of the invention that can be used to generate a 10 bit BASE/4 image.

FIG. 18 also illustrates a specific implementation of a FIG. 7 like stage-wise application of this invention that could be used with images encoded into the Photo CD storage scheme. A 10 bit BASE/4 spatial resolution image 160 is reconstructed from 8 bit Images BASE/16A 35B, BASE/16B 37B, BASE/4 33B, and BASE 31B. The 8 bit BASE/16A Image 35B, is formed with further quantizer 10–8 Bit C and the 8 bit BASE/16B Image 37B, is formed with further quantizer 10–8 Bit D. Also assume that the 8 bit BASE/4 Image, 33B, was formed with further quantizer 10–8 Bit B and that the 8 bit BASE Image 31B, was formed with further quantizer 10–8 Bit A.

The reconstructed, 9 bit, additional signal resolution images, in blocks 150 and 151, are formed as described above and are inputted to a reconstruction process in block 110A to produce the 10 bit, additional signal level BASE/4 spatial resolution image 160. The reconstruction process, of block 110A, similar to the reconstruction process, of block 110, with the exception that the reconstruction process, of block 110A, yields a 10 bit output at BASE/4 spatial resolution from two 9 bit inputs whereas the reconstruction process, of block 110, yields a 9 bit BASE spatial resolution output from two 8 bit inputs.

Figure 19:
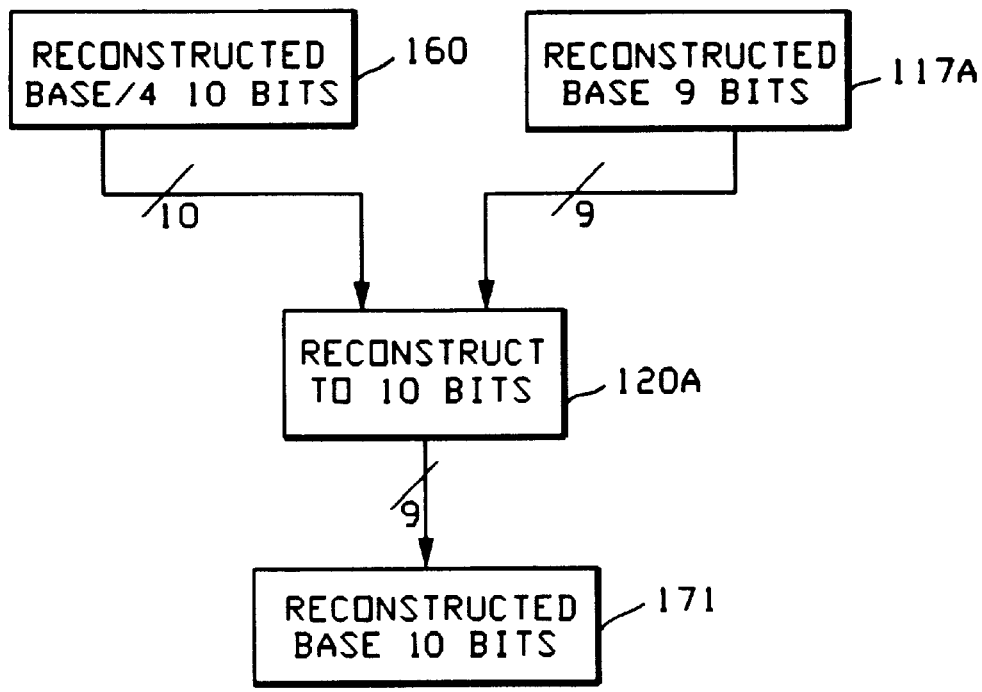
FIG. 19 illustrates in block diagram form a reconstruction scheme that can be used to generate a 10 bit BASE image.

FIG. 19 illustrates a reconstruction scheme that can be used to generate a 10 bit BASE image 171. This scheme is similar to that demonstrated in FIG. 13. A reconstructed 9 bit additional signal level image, 117A is formed by the reconstruction process, of block 110, of FIG. 13 with input images 33B and 31B being used in place of input images 33A and 31A. A previously reconstructed 10 bit additional signal level BASE/4 spatial resolution image 160, and the reconstructed 9 bit additional signal level BASE spatial resolution image, 117A, are inputted to a reconstruction process in block 120A, to produce the 10 bit, additional signal level BASE spatial resolution image 171. The reconstruction process, of block 120A is equivalent to the reconstruction process, of block 120 with the exception that the reconstruction process, of block 120A, yields a 10 bit output from two 9 bit inputs whereas the reconstruction process, of block 120, yields a 9 bit output from two 8 bit inputs.

Figure 20:
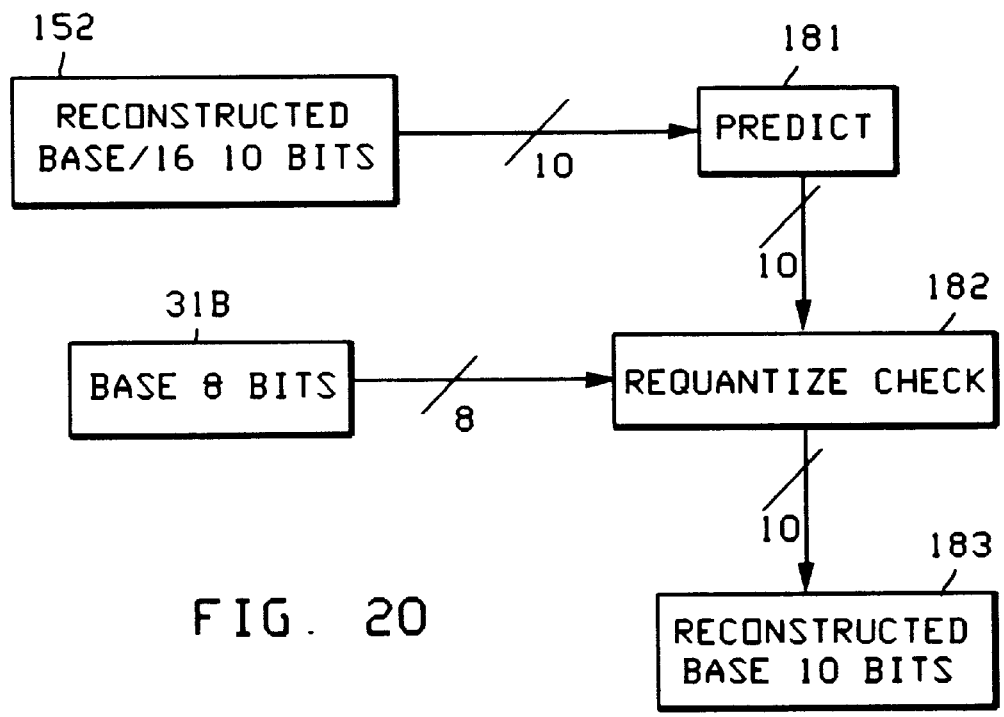
FIG. 20 illustrates in block diagram form yet another reconstruction scheme that can be used to generate a 10 bit BASE image.

FIG. 20 illustrates another reconstruction scheme that can be used to generate a 10 bit BASE image 183. The previously formed 10 bit BASE/16 additional signal level image 152 is increased in spatial resolution through a prediction process in block 181 to provide a 10 bit image with BASE resolution. The stored BASE resolution image 31B and the predicted 10 bit BASE Image, from block 181 are inputted to a requantize check step, in block 182, to insure that the fully reconstructed additional level Image 183, upon further requantization, would yield the stored BASE image 31B. As 8 bit and 10 bit images are inputted to the requantize check step, of block 182, requantization check schemes with multiple selection options, such as the requantization check scheme shown in FIG. 11 can be used.

While there has been shown what are considered to be the preferred embodiments of the invention, it will be manifest that many changes and modifications may be made therein without departing from the essential spirit of the invention. It is intended, therefore, in the annexed claims, to cover all such changes and modifications as may fall within the true scope of the invention.

What is claimed is:

1. A method for quantizing a digital image signal, comprising the steps of:
   a) forming a starting digital image signal having a first number of quantization signal levels from an input signal;
   b) forming at least two non-dependent digital image signals by further quantizing the starting digital image signal of step a) to fewer levels than said first number of quantization levels, by applying said starting digital image signal in parallel as inputs to functionally different quantizers; and
   c) reconstructing, with the aid of a computer, the digital image signal with more signal levels of quantization than in step b) from at least two of the at least two non-dependent digital image signals by combining the at least two non-dependent digital image signals from step b).

2. The method according to claim 1, wherein the at least two non-dependent digital signals from step b) are of the same spatial resolution.

3. The method according to claim 1, wherein the at least two non-dependent digital signals from step b) are of different spatial resolution.

4. The method according to claim 1, wherein step c) is further comprised of the steps of:
   I) forming a combined digital image signal by combining the at least two non-dependent digital image signals from step b);
   II) inputting the combined digital image signal from step I) and one of the non-dependent digital image signals from step b) to a requantization process; and
   III) utilizing the output of the requantization process from step II) to select the value for the digital image signal reconstructed from step c).

5. An apparatus for quantizing a digital image signal, comprising:
   a) first quantizing means having a first number of quantization signal levels for forming a starting digital image signal from input signals:
   b) at least two functionally different quantizing means each receiving as parallel inputs said starting digital image signal, for forming at least two non-dependent digital image signals by further quantizing said starting digital image signal to fewer levels than said first number of quantization signal levels; and
   c) reconstruction means for reconstructing the digital image signal with more signal levels of quantization from at least two of the at least two non-dependent digital image signals by combining the at least two non-dependent digital image signals.

6. Apparatus for obtaining additional signal level resolution from a quantized digital representation of an image, comprising:
   means for forming in parallel at least tow non-dependent digital representations of the image from the quantized digital representation of the image by quantizing with functionally different quantizers the quantized digital representation with fewer quantization levels than were used to quantize the digital representation of the image;
   round down means for truncating at least one of said at least two non-dependent digital representations;
   round up means for rounding up at least another of the at least two non-dependent digital representations; and
   means for averaging corresponding samples from the round down and round up means to provide a digital representation of the image with greater resolution than the quantized digital representation.

7. The apparatus according to claim 6 wherein said means for forming, quantizes with half the number of levels as was used for the quantized digital representation.

8. The apparatus according to claim 6 wherein said means for forming is comprised of at least two functionally different quantizers each receiving in parallel as an input the quantized digital representation of the image.

9. Apparatus for reconstructing an image with additional quantization levels of signal resolution from two quantized non-dependent representations of the image at the spatial resolution of one of the representations, comprising:
   means for converting one of the quantized non-dependent representations to the same spatial resolution as the other representation; and
   means for combining the converted and non-converted representations to form a combined representation with additional quantization levels of signal resolution.

10. The apparatus according to claim 9 wherein said means for combining performs an averaging function.

11. Apparatus for reconstructing an image with additional signal levels of resolution from two quantized non-dependent representations of the image at the spatial resolution of one of the representations, comprising:
   means for converting one of the quantized non-dependent representations to the same spatial resolution as the other representation;
   means for combining the converted and non-converted representations to form a combined representation with additional signal levels of resolution;
   means for converting the combined representation with additional resolution to N bits;
   means for quantizing the N bits;
   means for determining a difference between the quantized N bits and the bits representing a quantized non-dependent representation of the image; and
   logic means for selecting the combined image value when the difference is zero and the quantized non-dependent representation value when the difference is not zero.

12. The apparatus according to claim 11 wherein said logic means selects the combined image value when the difference is zero and a value less than the quantized non-dependent representation value when the difference is less than zero and a value greater than the quantized non-dependent representation value when the difference is greater than zero.

13. Apparatus for reconstructing an image with additional quantization levels of signal resolution from a multiplicity of quantized non-dependent representations of the image at the spatial resolution of one of the representations, comprising:
   means for converting a number of the multiplicity of the quantized non-dependent representations to the same spatial resolution; and
   means for combining the converted and non-converted representations to form a combined representation with additional quantization levels of signal resolution.

* * * * *